United States Patent

Auger et al.

[11] Patent Number: 6,120,246
[45] Date of Patent: Sep. 19, 2000

[54] TURBOCHARGER DRIVEN BY INTERNAL COMBUSTION ENGINE EXHAUST GASES

[75] Inventors: Denis Auger, Saint-Germain-en-Laye; Xavier Frere, Meudon-la-Foret; Christophe Thomas, Bourg-la-Reine; Philippe Treutenaere, Colombes, all of France

[73] Assignee: Renault, Boulogne-Billancourt, France

[21] Appl. No.: 09/125,020

[22] PCT Filed: Feb. 6, 1997

[86] PCT No.: PCT/FR97/00234

§ 371 Date: Oct. 5, 1998

§ 102(e) Date: Oct. 5, 1998

[87] PCT Pub. No.: WO97/29275

PCT Pub. Date: Aug. 14, 1997

[30] Foreign Application Priority Data

Feb. 9, 1996 [FR] France ..................................... 96 01601

[51] Int. Cl.[7] ...................................................... F02B 37/00
[52] U.S. Cl. ............................................. 415/205; 60/602
[58] Field of Search ...................... 60/598, 602; 415/203, 415/204, 205

[56] References Cited

U.S. PATENT DOCUMENTS 4,850,797 7/1989 Benson ..................................... 415/205

*Primary Examiner*—Noah P. Kamen
*Attorney, Agent, or Firm*—Oblon, Spivak, McClelland, Maier & Neustadt, P.C.

[57] ABSTRACT

A turbo-compressor for an internal combustion engine includes a centripetal turbine driven by the engine exhaust gases, the turbine containing a housing designed to receive a free-rotating wheel, the housing possessing an exhaust gas inlet intended to be connected to the exhaust manifold of the engine and extending perpendicular to the axis of rotation of the wheel, an intake pipe extended by an incurved passage machined inside the housing opening on the periphery of the wheel, so as to direct the exhaust gases radially toward the center of the wheel, in order to rotate the latter, a second interior passage collecting the exhaust gases at the outlet of the wheel and a discharge pipe whose outlet is intended to be connected to the exhaust line of the engine, the second passage being incurved. The axis of the exhaust gas outlet extends perpendicular to the axis of rotation of the wheel. The axis of the exhaust gas outlet and the axis of the exhaust gas inlet are appreciably on the same transverse plane relative to the axis ol the wheel.

7 Claims, 3 Drawing Sheets

TURBOCHARGER DRIVEN BY INTERNAL COMBUSTION ENGINE EXHAUST GASES

BACKGROUND OF THE INVENTION

1. Field of the Invention

This invention concerns turbo-compressors driven by the exhaust gases of internal combustion engines. It concerns, in particular, the turbine housings of turbo-compressors.

2. Description of the Related Art

It is conventional for a turbo-compressor equipping an internal combustion engine to consist of two turboshaft engines, one driving (the gas turbine) and the other being driven (the air compressor), which are connected to opposite ends of a common shaft. The exhaust gases of the internal combustion engine, or at least a portion of those gases, are sent to the turbine so that the energy of the gases rotates the common shaft and the compressor wheel, which produces suction and compression of the ambient air, the latter then being sent into the intake manifold of the internal combustion engine. This arrangement of a turbine and a compressor is well known and is similar to a supercharger, except that in the case of the latter, the compressor is rotated by a direct mechanical link with the crankshaft.

The generally centripetal turbine of the turbo-compressor consists of a spiral-shaped inlet casing, which radially distributes the exhaust gases around a wheel, and of a cylinder-shaped outlet which recovers the gases in the axis of the wheel. wheel. The stationary part of the turbine consists of a housing containing cast iron inlet and outlet pipes. The gas inlet, extending perpendicular to the axis of rotation of the wheel, comprises a flange intended to be bolted at the outlet of the exhaust manifold, while the outlet, on an extension of the axis of rotation of the wheel, comprises a flange designed for connection to the exhaust pipe of the vehicle. A turbo-compressor is thus known according to document EP-A-342361.

The use of a turbo-compressor offers numerous advantages, notably in that it improves filling of the internal combustion engine by increasing the density of the air and makes it possible, therefore, to widen the gear ratios and to lower the volume capacity of the engine for a given power. However, the use of a turbo-compressor also presents a number of disadvantages, notably, that of slowing down the temperature rise of the catalytic converter in the exhaust line at the turbine outlet.

In fact, the pollution standards for motor vehicles equipped with internal combustion engines are, in general, becoming more and more strict in all industrialized countries. The automobile industry is therefore totally mobilized to find technical solutions for responding to these constraints and has adopted the use of exhaust devices treating the noxious components of exhaust gases by catalytic conversion.

These purification devices, also called catalytic converters, make possible the oxidation of unburnt hydrocarbons and of carbon monoxide as well as the reduction of nitrogen oxides. Those reactions are all markedly accelerated by the presence of a catalyst, so that they can be accomplished during the brief time of passage of the exhaust gases through the converter.

However, the catalytic conversion of pollutants can be accomplished only when the catalyst has reached a sufficient temperature, generally higher than 300 C. As a result, notably on cold starting of an engine, the temperature of the exhaust gases is not sufficient to prime the chemical reactions and a long phase then follows during which the pollutants emitted by the engine are untreated or are not treated sufficiently. It can thus be estimated that 75 to 80% of pollutants are emitted during the first two minutes of running of the engine.

As a result, the presence of a turbine in the path of the exhaust gases upstream of the catalytic converter, which has the effect of appreciably increasing the heat losses undergone by the exhaust gases before they enter the catalytic converter, owing to lengthening of the path crossed by the exhaust gases and to the power supplied to the turbine, extends the priming time of the catalyst and, consequently, increases emissions of pollutants.

SUMMARY OF THE INVENTION

This invention is therefore intended to remedy the disadvantages mentioned by proposing a new type of turbo-compressor and, more particularly, a turbine housing limiting the heat losses of the exhaust gases in the catalyst priming phase, the turbo-compressor being of simple design and economical.

The turbo-compressor for an internal combustion engine according to the invention comprises a centripetal turbine driven by the engine exhaust gases, the turbine containing a housing designed to receive a free-rotating wheel. That housing possesses an exhaust gas inlet intended to be connected to the exhaust manifold of the engine and extending perpendicular to the axis of rotation of the wheel, an intake pipe extended by an incurved passage machined inside the housing and opening on the periphery of the wheel, so as to direct the exhaust gases radially toward the center of the wheel, in order to rotate the latter, a second interior passage collecting the exhaust gases at the outlet of the wheel and a discharge pipe whose outlet is intended to be connected to the exhaust line of the engine.

According to the invention, in the turbo-compressor for an internal combustion engine wherein the second passage is incurved so that the axis of the exhaust gas outlet extends perpendicular to the axis of rotation of the wheel, the axis of the exhaust gas outlet and the axis of the exhaust gas inlet being appreciably on the same transverse plane relative to the axis of the turbine wheel.

According to another characteristic of the turbo-compressor for an internal combustion engine, the exhaust gas outlet is arranged appreciably in the extension of the exhaust gas inlet.

According to another characteristic of the turbo-compressor for an internal combustion engine, the turbine housing includes a by-pass pipe connecting the inlet of the intake pipe to the outlet of the discharge pipe.

According to another characteristic of the turbo-compressor for an internal combustion engine, the by-pass pipe is appreciably straight and of restricted length.

According to another characteristic of the turbo-compressor for an internal combustion engine, the by-pass pipe cooperates with controlled shut-off means.

According to another characteristic of the turbo-compressor for an internal combustion engine, the controlled shut-off means are opened on starting of the engine.

BRIEF DESCRIPTION OF THE DRAWINGS

The purposes, aspects and advantages of this invention will be better understood, according to the specification given below of an embodiment of the invention, this embodiment being presented by way of nonlimitative example referring to the attached drawings, on which.

DETAILED DESCRIPTION OF THE PREFERRED EMBODIMENT

In accordance with the attached drawings, only the elements necessary for understanding of the invention have been represented. Furthermore, to facilitate the reading of these drawings, the same parts bear the same references from one figure to the other.

Figure 1:
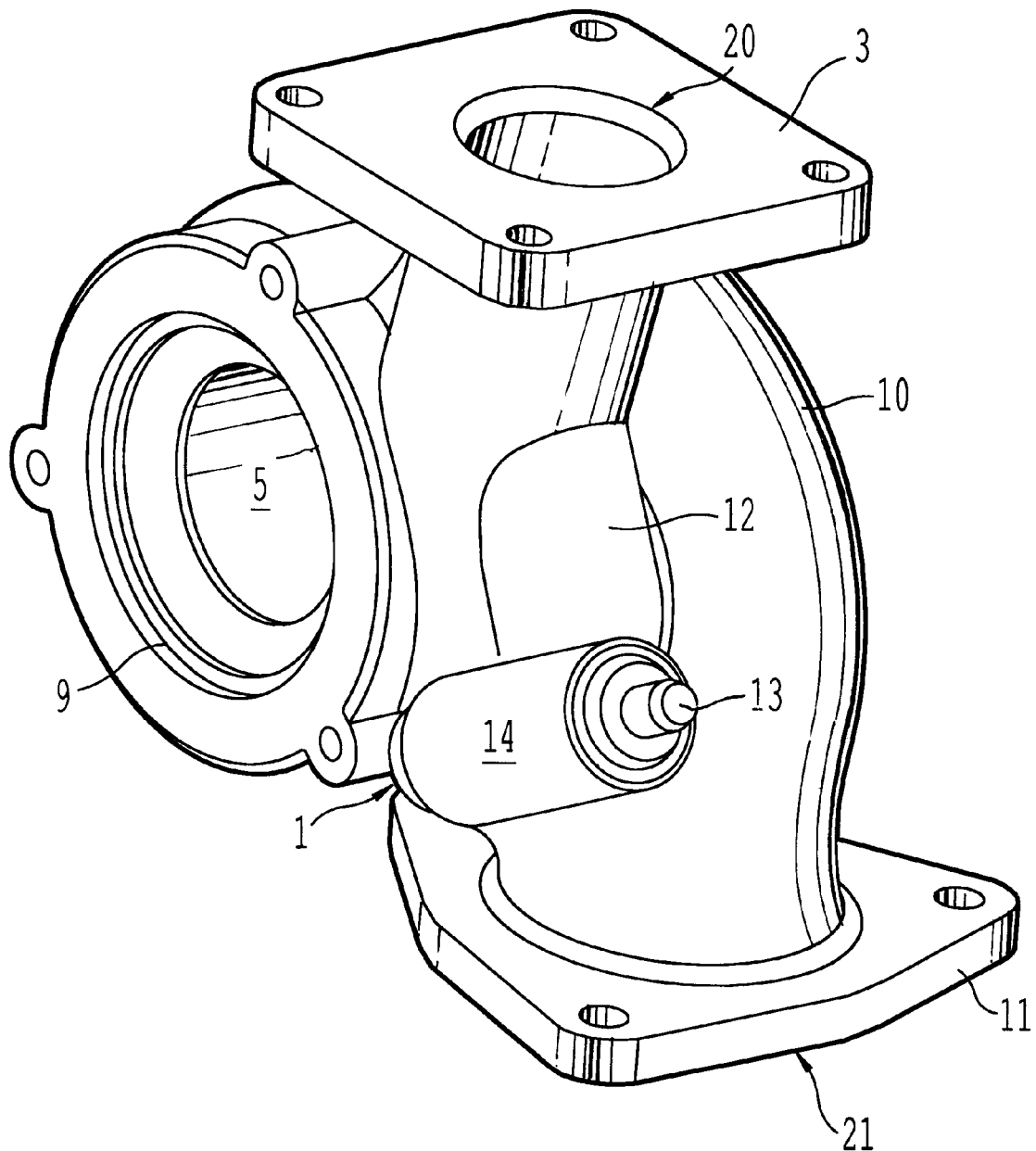
FIG. 1 is a view in perspective of a turbo-compressor turbine housing according to this invention.
Figure 2:
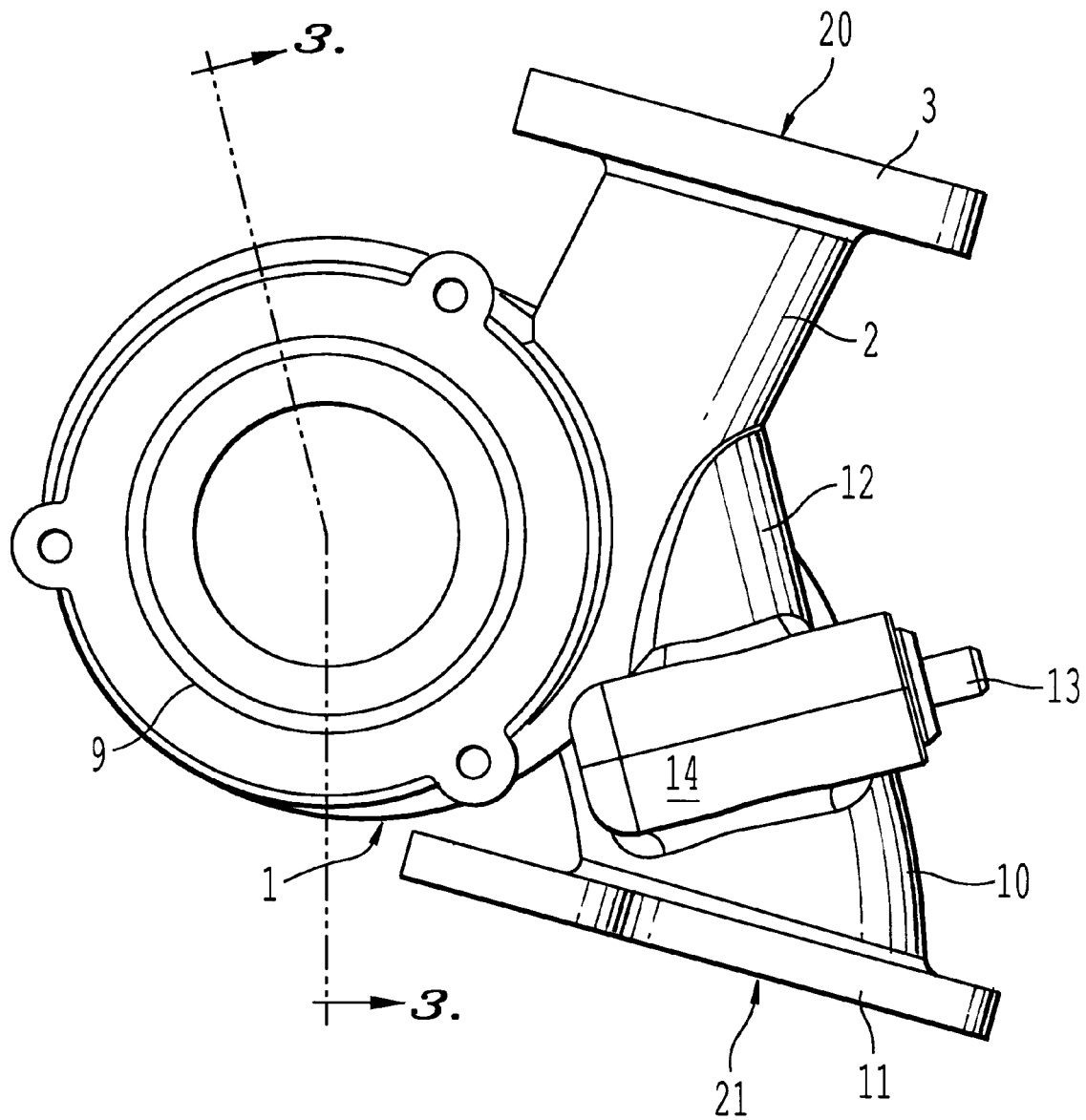
FIG. 2 is a front view of the turbine housing presented in FIG. 1.
Figure 3:
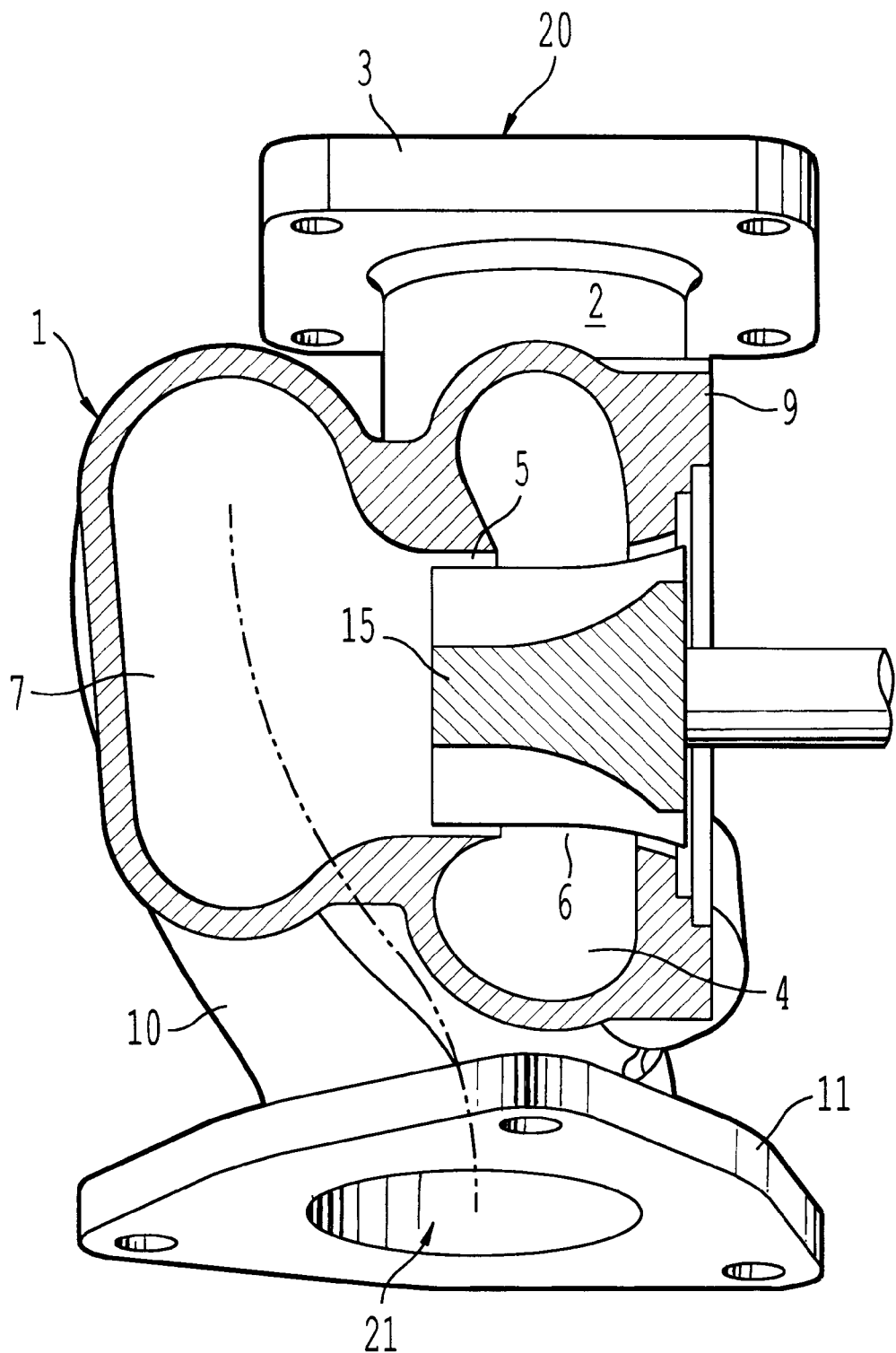
FIG. 3 is a cross section along line A—A of FIG. 2.

Referring to FIGS. 1 to 3, the turbine housing 1 of a turbo-compressor for an internal combustion engine is shown. That turbo-compressor, only the turbine housing of which is represented, consists, as is conventional, of three parts: a centripetal turbine which captures the energy of the exhaust gases, a center housing carrying the bearing of the shaft holding the turbine and compressor wheels and a centrifugal compressor which supercharges the engine.

The centripetal turbine consists of a spiral-shaped inlet casing, which distributes the exhaust gases around a wheel, the exhaust gases then escaping in the center of the wheel. The moving part of the turbine is then formed by a rotating part or turbine wheel 15 having blades or vanes of suitable profiles so that the resultant of forces exerted by the flow of exhaust gases determines a torque on the axis of the wheel.

The stationary part of the turbine 1 is formed by a cast iron housing 1, made of a single part or several joined parts, and containing the exhaust gas inlet and outlet pipes, as well as the recess of the turbine wheel. That housing 1 is made of materials capable of withstanding high temperatures, such as a nickel-based refractory cast iron.

The turbine housing 1 is designed to be fastened to one of the axial ends of the center housing, not shown, by a fitted coupling face 9 and an ear flange. That housing 1 includes an intake pipe 2 which receives the exhaust gases from the exhaust manifold of the internal combustion engine through an inlet 20 and which extends appreciably radially to the axis of rotation of the turbine wheel 15. The gas inlet includes a square flange 3 intended to be bolted at the outlet of the engine exhaust manifold.

Pipe 2 is extended inside the housing 1 in the form of a spiral incurved passage 4, also called volute, surrounding the wheel 15 of the turbine, mounted freely rotating in a corresponding recess 5, and that incurved passage 4 connects with the periphery of the turbine wheel 15 through a peripheral feed passage 6. Passage 4 presents, as is conventional, a surface of appreciably circular cross section which decreases the farther away one draws from inlet 20.

The recess 5 of the turbine opens at its axial end opposite the coupling face 9 into a second interior passage 7 of the housing 1. That passage 7, which collects the exhaust gases at the outlet of the turbine wheel, extends into an exhaust gas discharge pipe 10, the outlet 21 of which is surrounded by a fitted flange 11 intended to be bolted to the inlet of the engine exhaust line, which is not shown.

That second passage 7 is incurved, so that the pipe 10 evacuating exhaust gases from the turbine opens radially relative to the axis of rotation of the turbine wheel 15 appreciably in the same transverse plane as the intake pipe 2. That arrangement makes it possible to include the turbine in the flow of exhaust gases, limiting as much as possible the elongation of the path crossed by the exhaust gases and, therefore, the heat losses of the latter.

Thanks to that turbine housing 1 according to the invention, which has exhaust gas inlets 20 and outlets 21 lying substantially in the extension of one another and in proximity to each other, it is possible to place a catalytic converter on the engine exhaust line at a relatively close distance to the cylinder head of the engine and to the outlet of the combustion chambers (at less than 600 mm) and, therefore to have a very short catalyst priming time.

The housing 1 further includes a by-pass circuit operated by a controlled shut-off device, also called "wastegate." That bypass circuit consists of an appreciably straight pipe 12, connecting the inlet of the intake pipe 2 to the outlet of the exhaust pipe 10. The passage of gases through that pipe 12 is controlled by a shut-off device 13 (valve, clack valve, ... ) seated in a corresponding guide body 14, that shut-off device being controlled according to the supercharge pressure value desired as well as the operating conditions of the engine.

The shut-off device 13 is activated by operating means not shown, such as rods and levers, associated with a controlled drive system also not shown, such as a manometric capsule, whose volume integrated with operating means is, for example, drawn against a return spring by a partial vacuum or pressure source.

This partial vacuum or this pressure is adjusted by an electromagnetic valve driven by the electronic calculator of engine control in order, notably, to open the by-pass circuit under predetermined engine operating conditions such as the cold starting phases, and to further reduce the priming time of the catalyst in the exhaust line downstream of the turbine, reducing as much as possible the path of the exhaust gases and, therefore, their heat losses. This invention is, very clearly, not limited to that embodiment and any other type of actuator (electric, electromagnetic, hydraulic, etc.) can be used.

The arrangement of exhaust gas inlets 20 and outlets 21 in proximity to each other and preferably in the extension of one another makes it possible to have a very short by-pass pipe 12 (for example, less than 100 mm) and to limit the path of most of the exhaust gases passing through the turbine to the sole crossing of the by-pass pipe 12.

As a result, the turbine according to the invention has a most limited thermal impact on the course of the exhaust gases before they enter the catalytic converter. Such a turbine therefore makes it possible to envisage applications with turbo-compressors within the context of markedly stricter pollution emission standards.

The turbine housing 1 can be directly cast with the exhaust manifold (steel or cast iron). The exhaust manifold can likewise be made of single or double sheet steel welded on the turbine housing 1.

The orientation of the inlets 20 and outlets 21 in relation to each other can be adapted to accept the constraints of arrangement in the engine compartment.

This invention is applicable to all types of centripetal turbines and, in particular, to turbines with variable geometry. The invention likewise applies to turbines without a "wastegate".

What is claimed is:

1. Turbo-compressor for an internal combustion engine comprising a centripetal turbine driven by the engine exhaust gases, said turbine containing a housing designed to receive a free-rotating wheel, said housing possessing an exhaust gas inlet intended to be connected to the exhaust manifold of the engine and extending perpendicular to the axis of rotation of the wheel, an intake pipe extended by an incurved passage machined inside the housing opening on the periphery of the wheel, so as to direct the exhaust gases radially toward the center of the wheel, in order to rotate the latter, a second interior passage collecting the exhaust gases at the outlet of the wheel and a discharge pipe whose outlet is intended to be connected to the exhaust line of the engine, said second passage being incurved, so that the axis of the exhaust gas outlet extends perpendicular to the axis of rotation of the wheel, wherein the axis of said exhaust gas outlet and the axis of said exhaust gas inlet are substantially on the same transverse plane relative to the axis of the wheel.

2. Turbo-compressor for an internal combustion engine according to claim 1, wherein said exhaust gas outlet is arranged substantially in the extension of said inlet.

3. Turbo-compressor for an internal combustion engine according to claim 2, wherein said turbine housing includes a by-pass pipe connecting said intake pipe to said discharge pipe.

4. Turbo-compressor for an internal combustion engine according to claim 1, wherein said turbine housing includes a by-pass pipe connecting said intake pipe to said discharge pipe.

5. Turbo-compressor for an internal combustion engine according to claim 4, wherein said by-pass pipe is substantially straight.

6. Turbo-compressor for an internal combustion engine according to claim 2, wherein said bypass pipe is operated by controlled shut-off means.

7. Turbo-compressor for an internal combustion engine according to claim 5, wherein said by-pass pipe is operated by controlled shut-off means.

* * * * *